(12) United States Patent
Li et al.

(10) Patent No.: US 10,418,645 B2
(45) Date of Patent: Sep. 17, 2019

(54) MAGNESIUM PHOSPHATE CEMENT BASED BIPOLAR PLATE COMPOSITE MATERIAL

(71) Applicant: Nano and Advanced Materials Institute Limited, Hong Kong (CN)

(72) Inventors: Zongjin Li, Hong Kong (CN); Hongyan Ma, Hong Kong (CN); Wenbin Hao, Hong Kong (CN)

(73) Assignee: NANO AND ADVANCED MATERIALS INSTITUTE LIMITED, Hong Kong (CN)

( * ) Notice: Subject to any disclaimer, the term of this patent is extended or adjusted under 35 U.S.C. 154(b) by 182 days.

(21) Appl. No.: 15/686,149

(22) Filed: Aug. 24, 2017

(65) Prior Publication Data

US 2017/0358803 A1 Dec. 14, 2017

Related U.S. Application Data

(62) Division of application No. 14/841,692, filed on Aug. 31, 2015, now Pat. No. 9,774,043.

(51) Int. Cl.
| | |
|---|---|
| *H01M 8/02* | (2016.01) |
| *H01M 8/0243* | (2016.01) |
| *H01M 8/0236* | (2016.01) |
| *H01M 8/0234* | (2016.01) |

(52) U.S. Cl.
CPC ....... *H01M 8/0243* (2013.01); *H01M 8/0234* (2013.01); *H01M 8/0236* (2013.01); *Y02P 70/56* (2015.11)

(58) Field of Classification Search
None
See application file for complete search history.

(56) References Cited

U.S. PATENT DOCUMENTS

| | | | | |
|---|---|---|---|---|
| 6,345,162 B1* | 2/2002 | Ozawa | ............... | G03G 15/0853 |
| | | | | 399/149 |
| 7,527,098 B2* | 5/2009 | Santra | ................... | C04B 28/342 |
| | | | | 106/685 |
| 2006/0119018 A1* | 6/2006 | Watanabe | ............... | C04B 35/18 |
| | | | | 264/651 |
| 2016/0030631 A1* | 2/2016 | Agarwal | ............. | A61L 27/3821 |
| | | | | 424/422 |

* cited by examiner

*Primary Examiner* — Scott J. Chmielecki
(74) *Attorney, Agent, or Firm* — Eagle IP Limited; Jacqueline C. Lui (57) ABSTRACT

This invention provides a composite material for bipolar plates for fuel cells including cemented by a MPC binder and electrically conductive fillers, and a method of manufacturing the same. The resulting bipolar plate achieves low gas permeability, high electrical conductivity, high flexural strength and good corrosion resistance. The flexural strength and corrosion resistance can further be enhanced by the incorporation of macro-reinforcement and a polymer based surface treatment, respectively.

20 Claims, 9 Drawing Sheets

MAGNESIUM PHOSPHATE CEMENT BASED BIPOLAR PLATE COMPOSITE MATERIAL

FIELD OF INVENTION

The present invention relates to a method for the preparation of a bipolar plate composite material, in particular a method for preparing an inorganic binder/conductive carbon filler bipolar plate composite material for fuel cell.

BACKGROUND OF INVENTION

Fuel cell, especially proton exchange membrane fuel cell (PEMFC), due to its multifaceted advantages, is one of the most promising alternative sources of energy. Bipolar plate is one of the key components of a fuel cell, which accounts for around 80% of the volume and 45%-60% of the stack cost. Traditional bipolar plate materials include graphite, metals and polymeric composites. Cost and technical limitation of traditional bipolar plate materials is one of the reasons that limits the large-scale commercialization of fuel cells. Graphite seems to be an ideal material for bipolar plate, but due to its brittleness, difficulties in mechanical processing of flow-field make it very expensive. Metallic plates have high electrical conductivity and excellent mechanical properties, but they are easy to be oxidized in acidic environment, which make the service life of metallic bipolar plate relatively short. Anti-corrosion coatings can be applied on metallic plate surface and enhance the overall corrosion resistance. U.S. Pat. No. 7,632,592 B2 discloses a method of applying a high-grade stainless steel or alloy corrosion-resistant coating on a low-grade stainless steel (304L or 316L) substrate plate by a kinetic spray process. U.S. Pat. No. 6,372,376 B1 discloses a method for enhancing the corrosion resistance by providing a corrosion-resistant polymer coating containing a plurality of electrically conductive, corrosion-resistant filler particles on the metallic substrate. While enhancing the corrosion resistance, these coatings can increase the contacting resistance or largely increase the cost.

A number of polymer/carbon fillers composites have also been developed as bipolar plate materials. U.S. Pat. No. 7,910,040 B2 discloses a method for preparing a bipolar plate composite material, in which vinyl ester works as binder and graphite powder, carbon nanotubes (CNTs), carbon fiber and modified organo clay work as conductive fillers, using a bulk molding compound process. Taherian et al. (2013) developed a sandwich-structured triple-filler bipolar plate composite material consisting of phenolic resin, graphite powder, expanded graphite, carbon fiber and a thin carbon fiber cloth. However, the electrical conductivity and flexural strength of the polymer/carbon but still, the filler composite cannot be well balanced. Researchers at Wuhan University of Technology developed an aluminate cement-graphite powder bipolar plate composite material, which has been proven to be of high-strength, highly conductive and low-cost. However, the structure of aluminate cement becomes unstable in acidic environment (<pH4), accompanied by the dissolution of metallic ions, such as $Ca^{2+}$, $Al^{3+}$, and so on, which will contaminate the proton exchange membrane and affect the performance of PEMFC.

Therefore, there is a need to develop a bipolar plate composite material with enhanced properties.

SUMMARY OF INVENTION

In the light of the foregoing background, it is an object of the present invention to provide an inexpensive fuel cell bipolar plate having desired properties such as high electrical conductivity, high flexural strength, high corrosion resistance and low gas permeability. It is also an object of this invention to illustrate a detailed method for preparing the aforesaid bipolar plate. A low-cost high-performance bipolar plate will promote the large-scale commercialization of fuel cells.

Accordingly, the present invention, in one aspect, is a bipolar plates composite material includes an inorganic low-pH cement based binder with grains, which can achieve fast setting and high strength, such as magnesium phosphate cement (MPC); and electrically conductive filler are graphite powder, carbon black, carbon nanotubes, carbon fibers, and any combination thereof; the particle size of the filler is at least one order of magnitude smaller than the particle size of the gains in the binder such that the distribution of the filler particles are restricted in a narrow space by the binder particles to form a percolated conductive pathway with improved conductivity. In a further embodiment, the pH value of the acidic cement based binder is 6-8.

In an exemplary embodiment of the present invention, the acidic cement based binder is magnesium phosphate cement based binder including magnesia, potassium di-hydrogen phosphate, borax and water; the magnesia-to-potassium di-hydrogen phosphate molar ratio of the binder is 6-12:1. In a further embodiment, the magnesia is dead burnt magnesia. In another further embodiment, in the binder, the borax is 5% of the weight of the magnesia; and water-to-cement ratio by weight is 0.2-0.3.

In another embodiment, the binder further includes fly ash replacing 20-40% of the mass of the magnesia in the binder. In another embodiment, the fillers are loaded at 40-56% of the total volume of the binder; the fillers are graphite powder of 35-50% by weight, carbon black of 2-10% by weight, carbon nanotubes of 0.5-4% by weight, carbon fibers of 0.5-3% by weight, and any combination thereof.

In a preferable embodiment, bipolar plates composite material including a composition of 52% by volume of the binder and 48% by volume of the filler; in which the filler includes 45% by volume of the graphite powder; 1% by volume of the carbon fibers; and 2% by volume of the carbon nanotubes; the binder includes a composition of 38.05% by weight of the magnesia; 22.93% by weight of the potassium di-hydrogen phosphate; 2.72% by weight of the borax; 16.3% by weight of the fly ash; and 20% by weight of the water.

According to another aspect of the present invention, it provides a bipolar plates composite material includes a magnesium phosphate cement based binder; and electrically conductive fillers; in which the binder is a multi-component inorganic binder including magnesia, potassium di-hydrogen phosphate, borax and water; the magnesia-to-potassium di-hydrogen phosphate molar ratio of the binder is 6-12:1; the fillers are graphite powder, carbon black, carbon nanotubes, carbon fibers, and any combination thereof.

In an exemplary embodiment of the present invention, the binder further includes fly ash replacing 20-40% of the weight of magnesia in the binder. In a further embodiment, the composite material further including a composition of 52% by volume of the binder and 48% by volume of the filler; in which the filler includes 45% by volume of the graphite powder; 1% by volume of the carbon fibers; and 2% by volume of the carbon nanotubes; the binder includes a composition of 38.05% by weight of the magnesia; 22.93% by weight of the potassium di-hydrogen phosphate; 2.72% by weight of the borax; 16.3% by weight of the fly ash; and 20% by weight of the water.

In a further aspect of the present invention, it relates a method for preparing a bipolar plates composite material, including steps of:

a. mixing magnesium phosphate cement raw materials and the fillers;

b. mixing the mixed product from step (a) with water to form a wet powder;

c. transferring the wet powder from step (b) into a mold;

d. using hot-press to convert the wet powder in the mold into a plate; and e. curing the plate to achieve properties of interest.

In an exemplary embodiment, the mixing in both step (a) and step (b) are conducted in an automatic mechanical grinding setup to achieve a homogeneous distribution of the fillers in the binder.

In an embodiment, the step (d) is processed under a compressive pressure of 70 MPa and a temperature of up to 140° C., with a loading duration up to 60 min.

In an embodiment, in the step (e), the plate of the step (d) is sandwiched between two steel plates for air curing for one day.

In an embodiment, it further includes step (f) of incorporating a macro-reinforcement to further enhance the flexural strength of the composite material, the macro-reinforcement is placed in the steel mold in the step (c).

In an embodiment, the macro-reinforcement is a thin acrylonitrile butadiene styrene co-polymer net produced by 3D printing.

In another embodiment, it further including step (g) of polymer based surface treatment of the composite material after step (d) to further enhance the corrosion resistance of the composite material. In further embodiment, the polymer is ultra-high molecular weight polyethylene powder, with a molecular weight of 3,500,000 and a melting point of 142° C. In a further embodiment, the polymer replaces 30% of the binder in the surface layer of the composite material. In another further embodiment, after the step (g) includes increasing the mold temperature 160° C. to allow melting of the polymer and the formation of an organic-inorganic interpenetrated structure, and cooling the heated product to allow formation of a polymer enhanced surface layer for the composite material.

DETAILED DESCRIPTION OF THE PREFERRED EMBODIMENTS

As used herein and in the claims, "comprising" means including the following elements but not excluding others.

As used herein and in the claims, "acidic cement based binder" refers to any cement based binders that can work in a typical fuel cell acidic environment (<pH4) without being dissolved or decomposed by the fuel cell environment in affecting the performance of the fuel cell during normal operation of the fuel cell.

Magnesium phosphate cement (MPC) is a type of low-pH cement, and it can be kept stable under acidic environment. Using MPC as the matrix, and carbon-based materials (graphite powder, carbon fiber, CNT, etc.) as fillers, it is possible to produce high performance bipolar plate that fulfils all technical targets set forth by the US Department of Energy (DOE) and achieves the goal of lowering cost.

The present invention provides a bipolar plate composite material for fuel cells containing, for example, MPC, an inorganic binder, and electrically conductive carbon fillers including graphite powder, carbon black, CNTs, carbon fibers, etc. The production of bipolar plate composite material for fuel cells is also provided in which the bipolar plate composite material is produced. The bipolar plate composite material prepared according to the present invention have desired properties according to US DOE, such as high electrical conductivity, flexural strength and corrosion resistance, while the production cost thereof can be greatly reduced.

The Bipolar Plate Composite Material

The bipolar plate composite material contains MPC binders and electrically conductive fillers. In one exemplary embodiment, the electrically conductive fillers are cemented by the MPC binder to form the bipolar plate composite material. MPC is a multi-component inorganic binder consisting of dead burnt magnesia, potassium di-hydrogen phosphate (KDP) and borax, in which the magnesia-to-KDP molar ratio (M/P) is 6-12:1; in another exemplary embodiment, MPC also contains fly ash. Borax is added as a reaction retarder at 5% of the weight of magnesia; in another exemplary embodiment, fly ash is added to replace 20-40% of the magnesia.

In one exemplary embodiment, the electrically conductive fillers (or fillers) are loaded at 40-56 vol. % based on the total volume of the MPC binder. In another exemplary embodiment, the fillers include 35-50% graphite powder, and/or 2-10% carbon black, and/or 0.5-4% carbon nanotubes (CNTs), and/or 0.5-3% carbon fibers, and/or any combination thereof.

Process

The composite material in the following examples of the present invention are prepared by the following steps: (a)

mixing MPC raw materials and electrically conductive fillers according to a particular mix proportion; (b) mixing the mixed product from step (a) with a particular amount of deionized water to form wet powder; (c) transferring the product from step (b) into a steel mold; (d) using hot-press to convert the wet powder in the mold into a plate; (e) curing the plate to achieve the properties of interest and/or until such properties has become stable.

Figure 2:
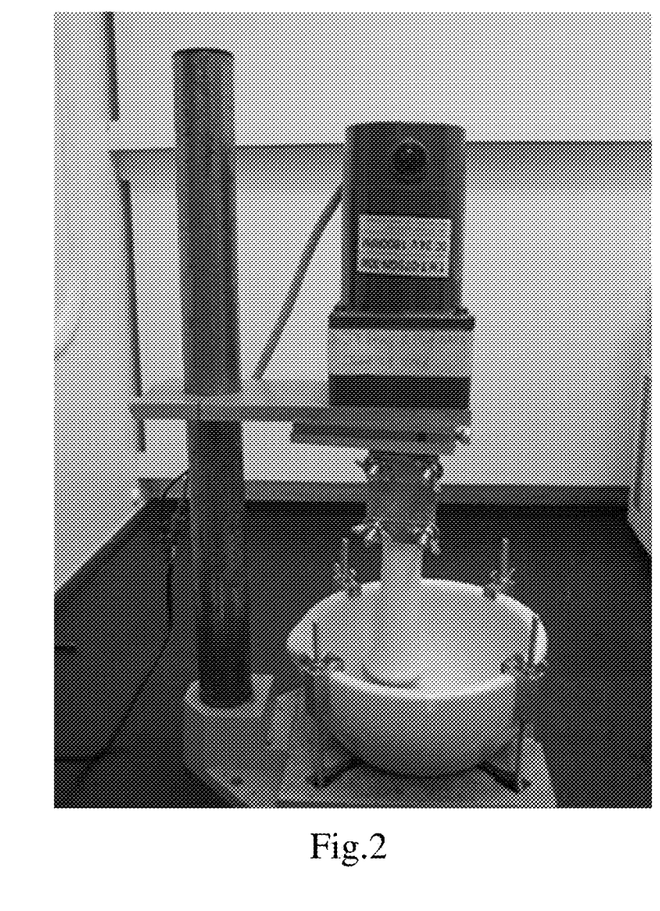
FIG. 2 shows the automatic mechanical grinding setup for the mixing of raw materials.

Preferably, the mixing of step (a) and step (b) are conducted in an automatic mechanical grinding setup to achieve a homogeneous distribution of the fillers in the binder phase. The automatic mechanical grinding setup includes a fixed mortar and an automatic pestle. When mixing, room temperature water is added at a water-to-cement ratio (W/C) of 0.2-0.3 by weight, allowing the formation of magnesium potassium phosphate hexahydrate (MKP, or struvite-K) as the main cementing phase according to the following reaction:

$$MgO+KH_2PO_4+5H_2O \rightarrow MgKPO_4 \cdot 6H_2O \quad (I)$$

The steel mold for preparing the bipolar plate in step (c) can be designed according to the shape and flow field demanded by the fuel cell.

The hot-press in step (d) is a process involving the conversion of the wet powder into a plate under a compressive pressure of 70 MPa and a temperature of up to 140° C., with a loading duration up to 60 min depending on the composition of the binder.

The curing in step (e) indicates an air curing process for the resulting plate sandwiched between two steel plates for one day, which allows the release of the stress and the completion of the chemical process as indicated in equation (I) in the pressed plates.

To further enhance the flexural strength of the resulting composite material, macro-reinforcement is incorporated in a further step (f). The macro-reinforcement could be a thin acrylonitrile butadiene styrene (ABS) co-polymer net produced by 3D printing.

A polymer based surface treatment is adapted in a further step (g) to further enhance the corrosion resistance of the bipolar plate composite material. The polymer could be a type of ultra-high molecular weight polyethylene powder, with a molecular weight of 3,500,000 and a melting point of 142° C., which is used to replace 30% of the binder in the surface layers of the composite material. After a normal hot-press process as in step (d), the mold temperature is increased to 160° C. to allow the melting of the polymer and the formation of an organic-inorganic interpenetrated structure, which is followed by a cooling process to allow the formation of a polymer enhanced surface layer for the composite material.

In the following examples, the raw materials for making MPC include dead burnt magnesia powder (calcined under 1600° C. for 5 hours, passed a 300 μm sieve) with a purity of 95.1%, powder KDP (which is grounded and passed a 250 μm sieve before mixing), fly ash (with a mean particle size of 18 μm) and deionized water. Micro-sized powder graphite (>95% particles are smaller than 30 μm), nano-sized powder carbon black (mean particle size <100 nm), short carbon fiber (2 mm pitched carbon fiber) and industrial CNTs were employed as functional fillers, to provide conductive pathways in the composite material.

Figure 1A:
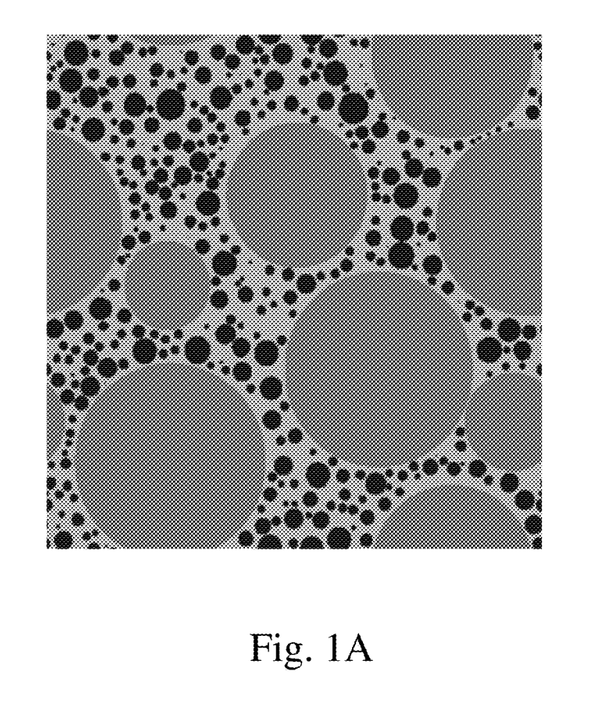
FIGS. 1A and 1B shows a comparison of the filler volumetric efficiency in a MPC-carbon filler composite and a polymer-carbon filler composite with the same filler loading: MPC-carbon composite in FIG. 1A and polymer-carbon composite in FIG. 1B. Black dots, matrix in light gray and circles in grey represent the carbon fillers, the binder phase and unreacted magnesia grains, respectively.
Figure 1B:
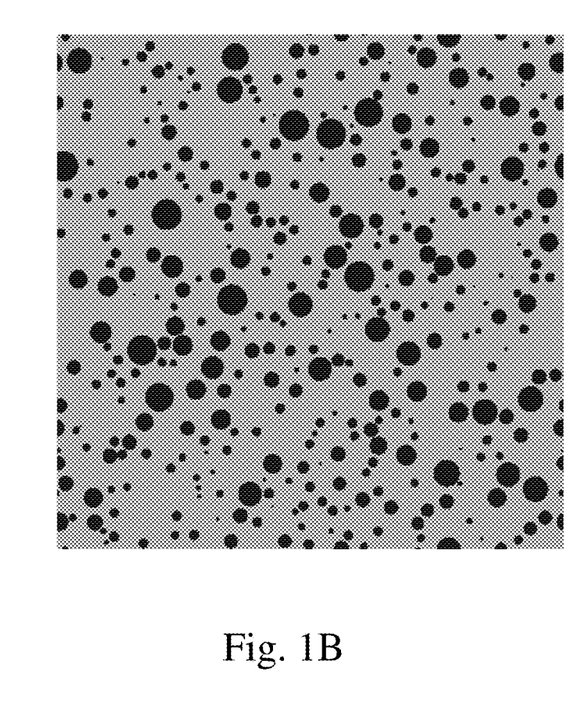

In a MPC, the normal optimized magnesia-to-KDP molar ratio (M/P) for the chemical reaction of equation (I) is 1:1. However, in the present invention, the M/P is 6~12:1, so that the degree of reaction will be very low. In such cases, a large volume fraction of unreacted magnesia particles remain in the binder phase of the composite material. The magnesia particles are 1~300 μm, while graphite powder is <30 μm; the characteristic size of carbon black powder is 100 nm. The diameters of CNT and carbon fiber are 30 nm and 2 μm, respectively. As compared with the filler particles, the unreacted magnesia particles are much larger. The distribution of filler particles is thus restricted in a narrower space as limited by the unreacted magnesia grains, so that the volumetric efficiency of the fillers in forming a percolated conductive pathway is improved. In this way, the target electrical conductivity, i.e. 100 S/cm, can be achieved at a relatively low filler volume fraction (~50%). As a comparison, in a polymer/carbon filler bipolar plate composite material, the filler particles are distributed in a homogeneous binder phase, as the polymer molecules are much smaller than the filler particles. In the case of polymer-graphite composite materials, typically 70% (volume fraction) of carbon materials are mixed with 30% of polymeric binder to achieve conductivities between 50 and 100 S/cm. Larger amount of graphite will significantly reduce the strength of the composite material. This comparison is clearly shown in FIG. 1. The lowered carbon filler volume fraction of the composite material of this invention not only limits the raw material cost, but also avoid the severe strength reduction due to the incorporation of the fillers.

In the following examples, the mixing of raw materials is conducted by an automatic mechanical grinding setup, which includes a fixed mortar and an automatic pestle as shown in FIG. 2. The mixed wet mixture is transferred into a steel mold, and pressed into a 100 mm×50 mm×3 mm plate.

Key properties of the bipolar plate composite material include electrical conductivity, flexural strength, corrosion resistance and gas permeability. All materials obtained in the following examples were tested for gas permeability, using a commercial gas permeability tester designed according to ASTM D1434. The permeabilities of all the MPC/carbon filler composites are lower than the testing capacity of the tester, which means that the equivalent hydrogen gas permeation coefficient of the composites is much lower than the target value, i.e. $10^{-5}$ cm$^3$/(s·cm$^2$). Besides, the electrical conductivity was measured by a four-point probe resistivity meter, the flexural strength was tested according to ASTM D790-10, and the corrosion resistance was evaluated under conditions recommended by US DOE—anode corrosion current density test conditions: pH 3, 0.1 ppm HF, 80 degree, potentiodynamic test at 0.1 mV/s, −0.4V to +0.6V (Ag/AgCl), de-aerated with Ar purge; cathode corrosion current density test conditions: pH 3, 0.1 ppm HF, 80 degree, potentiostatic test at +0.6V (Ag/AgCl) for >24 h, aerated solution (US DOE 2012).

Examples 1-6

Raw materials used in examples 1-6 are dead burnt magnesia, KDP, borax, fly ash, water, graphite powder, carbon black, CNTs and carbon fiber. In the binder of Example 1, the magnesia-to phosphate molar ratio is 8, the water-to-cement mass ratio is 0.25 and dosage of borax is 5% of the mass of magnesia. In the binder of Examples 2-6, fly ash is used to replace 30% of the mass of magnesia, while other ratios remain the same as those in Example 1. Correspondingly, the mass based compositions of 100 g binders of Examples 1-6 are listed in Table 1. Electrically conductive fillers take different volume fractions in the 6 examples as shown in Table 2.

The raw materials are mixed in the setup as shown in FIG. 2 for 20 min, and placed for another 10 min. The wet mixture is then transferred into the steel mold, and processed in a hot-press under 100° C. The pressure is applied in two steps, i.e. a pre-loading at 5 MPa for 15 min, followed by a loading at 70 MPa for 30 min. The loading process is followed by unloading, de-molding and curing to obtain the bipolar plate composite material. The resulting composite material is then tested for properties of interest such as electrical conductivity, flexural strength and corrosion current density, and the results thereof are shown in Table 3.

The compositions in all of Examples 1-6 contain 45% graphite powder based on the total volume of the produced composite material, with different amounts of other components. Graphite powder is used as the dominant conductive filler, due to its low cost and high performance. In view of the test results, partial replacement of the magnesia in the binder by fly ash can improve the flexural strength and corrosion resistance of the composite material, with a slightly negative effect on the electrical conductivity. The incorporation of a small amount of carbon fiber is intended to improve all of the properties of the resulting composite material, but when the carbon fiber loading reaches 3%, all of the properties are reduced due to the conglomeration of carbon fibers. The adding of carbon black, at a relatively small dosage, can significantly increase the electrical conductivity, but would lead to a much poorer corrosion resistance at the same time. CNTs can play a similar role of carbon black in enhancing the electrical conductivity, without resulting in a negative effect on the corrosion resistance. Surprisingly, CNTs at a volume fraction of 2% can also enhance the flexural strength. However, CNTs at higher volume fraction will also conglomerate and lead to the overall degradation of the composite properties. The effect of graphite volume fraction, carbon fiber, carbon black and CNTs on the electrical conductivity, corrosion current density and flexural strength of the composite are studied and shown in FIGS. 6-9.

TABLE 1

Composition of binders (unit: g/100 g binder)

| Materials | Magnesia | KDP | Borax | Fly ash | Water |
|---|---|---|---|---|---|
| Ex. 1 | 54.35 | 22.93 | 2.72 | 0 | 20 |
| Exs. 2-6 | 38.05 | 22.93 | 2.72 | 16.3 | 20 |

TABLE 2

Composition of composite material (unit: %)

| Materials | Binder | Graphite | Carbon fiber | Carbon black | CNTs |
|---|---|---|---|---|---|
| Ex. 1 | 54 | 45 | 1 | — | — |
| G35 | 65 | 35 | — | — | — |
| G40 | 60 | 40 | — | — | — |
| G45 | 55 | 45 | — | — | — |
| G50 | 50 | 50 | — | — | — |
| CF0.5 | 54.5 | 45 | 0.5 | — | — |
| Ex. 2 | 54 | 45 | 1 | — | — |
| CF2 | 53 | 45 | 2 | — | — |
| Ex. 3 | 52 | 45 | 3 | — | — |
| CB2 | 52 | 45 | 1 | 2 | — |
| Ex. 4 | 51 | 45 | 1 | 3 | — |
| CB6 | 48 | 45 | 1 | 6 | — |
| CB10 | 44 | 45 | 1 | 10 | — |
| CNT0.5 | 53.5 | 45 | 1 | — | 0.5 |
| CNT1 | 53 | 45 | 1 | — | 1 |
| Ex. 5 | 52 | 45 | 1 | — | 2 |
| CNT3 | 51 | 45 | 1 | — | 3 |
| Ex. 6 | 50 | 45 | 1 | — | 4 |

TABLE 3

Achieved properties of the composites

| Properties | Electrical conductivity (S/cm) | Flexural strength (MPa) | Corrosion current density ($10^{-6}$ A/cm$^2$) |
|---|---|---|---|
| Ex. 1 | 124 | 19.7 | 2.7 |
| G35 | 64 | 23.1 | 0.73 |
| G40 | 85 | 21.9 | 1.2 |
| G45 | 105 | 21.3 | 1.9 |
| G50 | 135 | 21 | 3.1 |
| CF0.5 | 108 | 22.9 | 1.7 |
| Ex. 2 | 107 | 23.1 | 0.93 |
| CF2 | 115 | 23.3 | 1.1 |
| Ex. 3 | 99 | 18.6 | 2.9 |
| CB2 | 127 | 23.2 | 2.1 |
| Ex. 4 | 146 | 22.9 | 3.5 |
| CB6 | 183 | 21.8 | 5.4 |
| CB10 | 207 | 20.9 | 11.7 |
| CNT0.5 | 111 | 24.3 | 0.89 |
| CNT1 | 125 | 25.1 | 0.67 |
| Ex. 5 | 139 | 25.9 | 0.53 |
| CNT3 | 145 | 19.8 | 1.4 |
| Ex. 6 | 123 | 17.7 | 3.1 |

Example 7

As shown in Table 3, the flexural strengths of the composite material of some Examples are lower than the US DOE technical target, i.e. 25 MPa. It has been proven that, for bipolar plate composite material with a thickness of several millimeters, a slightly lower flexural strength will not lead to plate breaking under normal cell assembling and operating conditions. However, it is preferred to have the target flexural strength achieved reliably. For this purpose, in the present Example, an ABS reinforcement is used to enhance the flexural strength of the resulting composite material.

Figure 3:
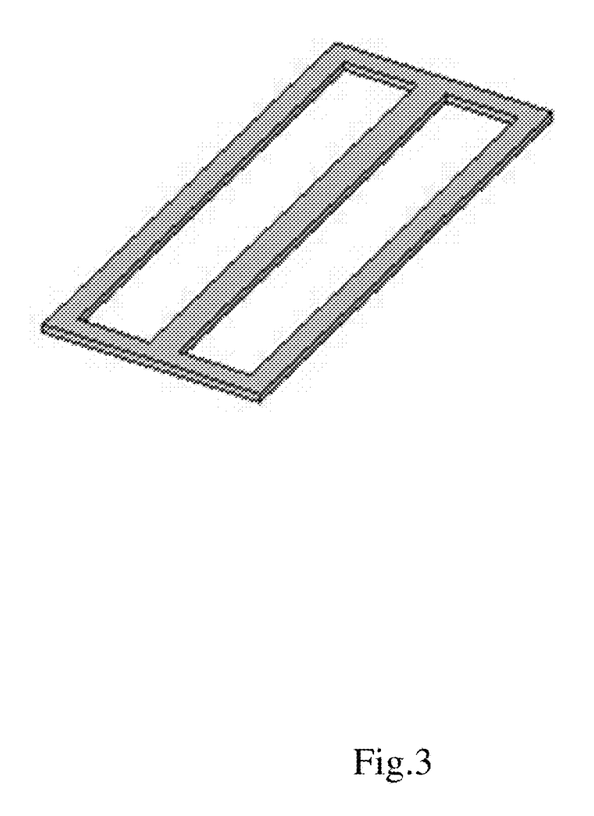
FIG. 3 shows the acrylonitrile butadiene styrene co-polymer macro-reinforcement produced by 3D printing for the purpose of enhancing the flexural strength.

The ABS reinforcement is produced by 3D printing, which is 84 mm long, 34 mm wide and 0.8 mm thick, and the rib width is 5 mm, as shown in FIG. 3. The surface of the reinforcement can be processed to a very rough surface to enhance the mechanical locking between the reinforcement and the matrix, which can be easily achievable by adjusting the printing settings.

Also, in the present Example, the composition of the binder is the same as that in Example 5, and the hot-press process is also the same as that used in Examples 1-6, except that the ABS reinforcement is placed in the composite material matrix when filling the mold. As compared with Example 5, although there are no obvious differences to the electrical conductivity (141 S/cm) and the corrosion current density ($0.59 \times 10^{-6}$ A/cm$^2$) by the application of the macro-reinforcement, the flexural strength (29.9 MPa) of the composite material with macro-reinforcement is improved.

Example 8

The US DOE corrosion current density target for bipolar plate is <1×10$^{-6}$ A/cm$^2$. As shown by the previous test results, this target can be achieved in Examples 2, 5 and 7. To guarantee the durability of the bipolar plate as well as the fuel cell, the bipolar plate has to have satisfactory corrosion resistance.

Figure 4:
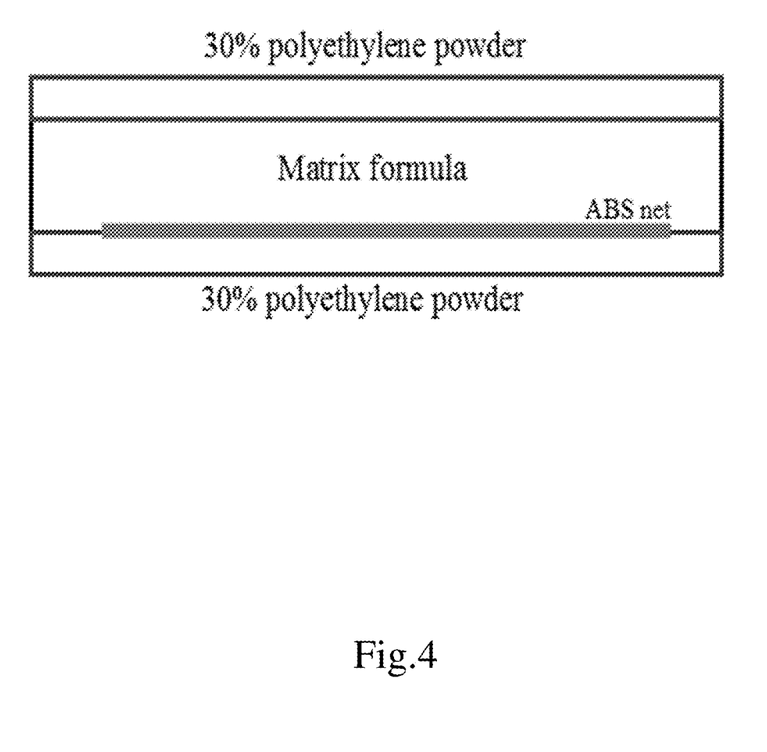
FIG. 4 shows a sketch of the surface-treated sandwich composite structure for the purpose of enhancing the corrosion resistance.

In the present Example, composite material with compositions of Example 7 is used, but the 3 mm thick plate is divided into 3 layers, i.e. two 0.6 mm thick surface layers and a 1.8 mm central layer, as shown in FIG. 4. In the two surface layers, an ultra-high molecular weight (3,500,000) polyethylene with a melting point of 142° C. is used to replace 30% of the binder phase. After a normal hot-press process as used in previous Examples, the mold temperature is raised to 160° C. and held for 10 min, and then the plate is cooled down. This increased mold temperature is higher than the melting point of the polymer, so that the melting of the polymer in the surface layers are allowed. After cooling, an organic-inorganic interpenetrated binder structure can be formed to protect the functional fillers from being oxidized. As compared with Examples 5 and 7, this surface treatment brings negative effect on the electrical conductivity (116 S/cm) and positive effect on the flexural strength (31.1 MPa) to the composite material of Example 8, and significantly reduces the resulting corrosion current density (0.15×10$^{-6}$ A/cm$^2$).

Figure 5:
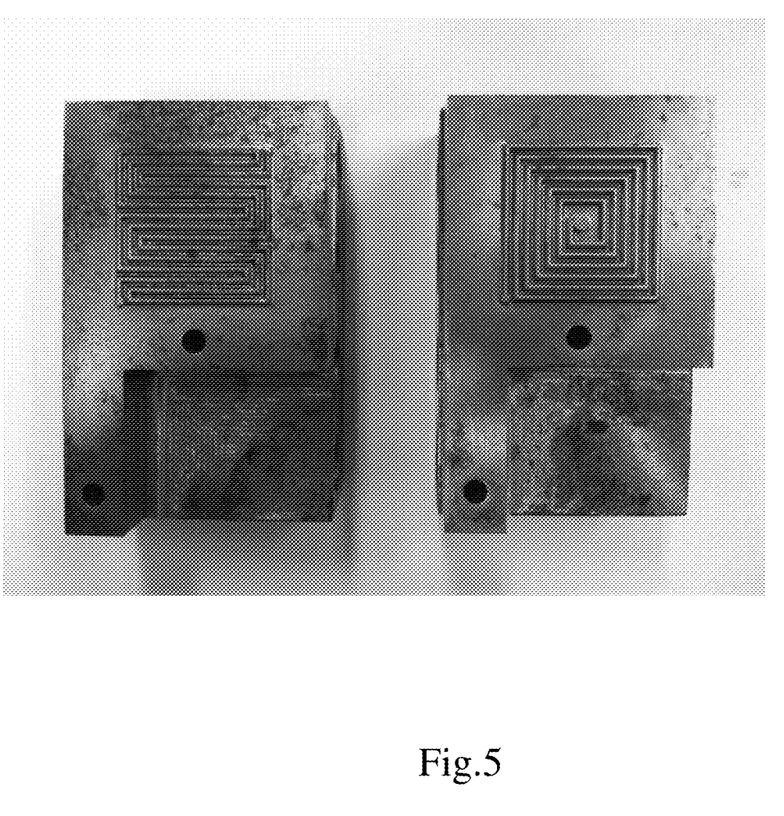
FIG. 5 shows the compression plate component of the hot-press for bipolar plate production, with counter channels and lands patterned on the surface.
Figure 6:
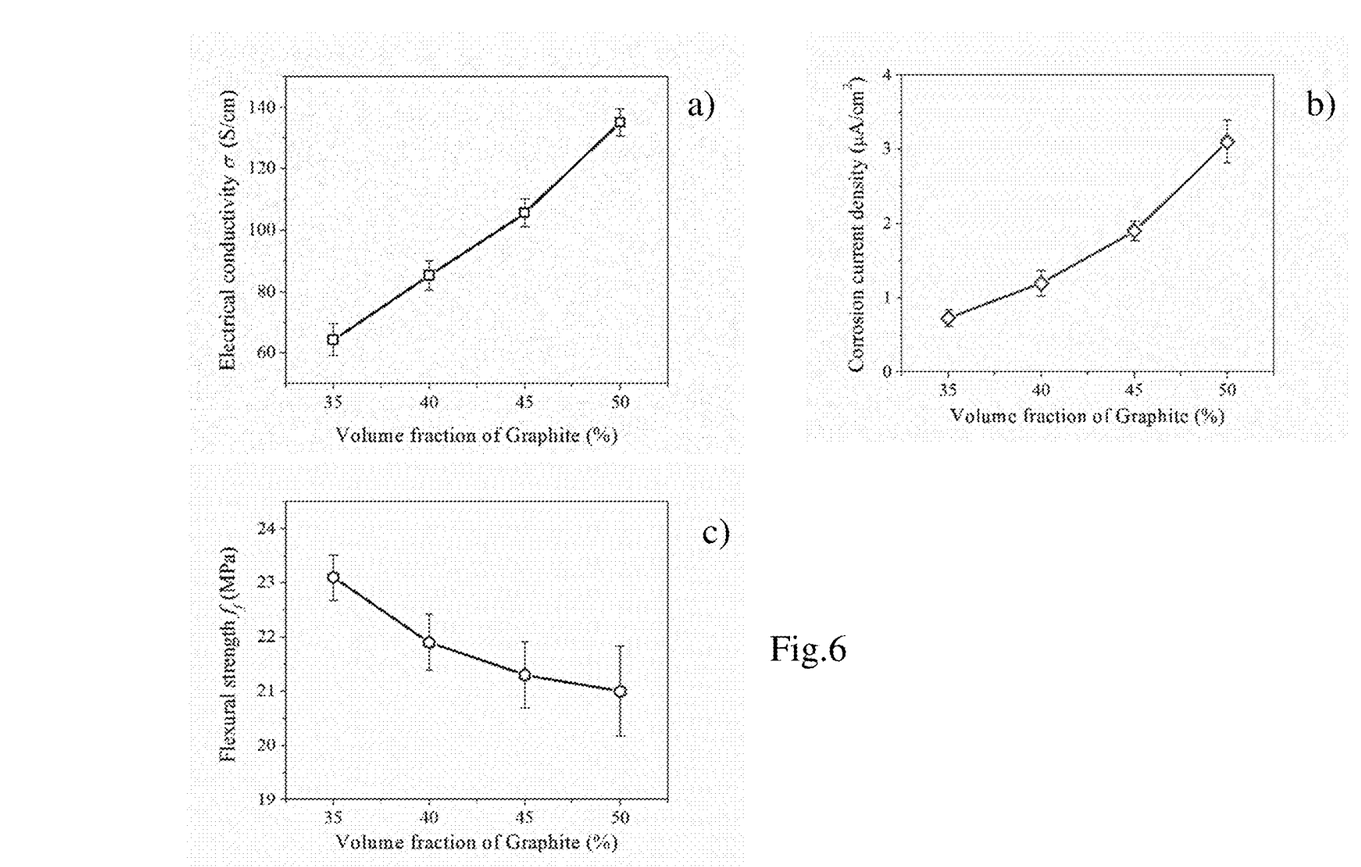
FIG. 6 shows the effect of graphite volume fraction on electrical conductivity, corrosion current density and flexural strength of the composite (data from G35-G50).
Figure 7:
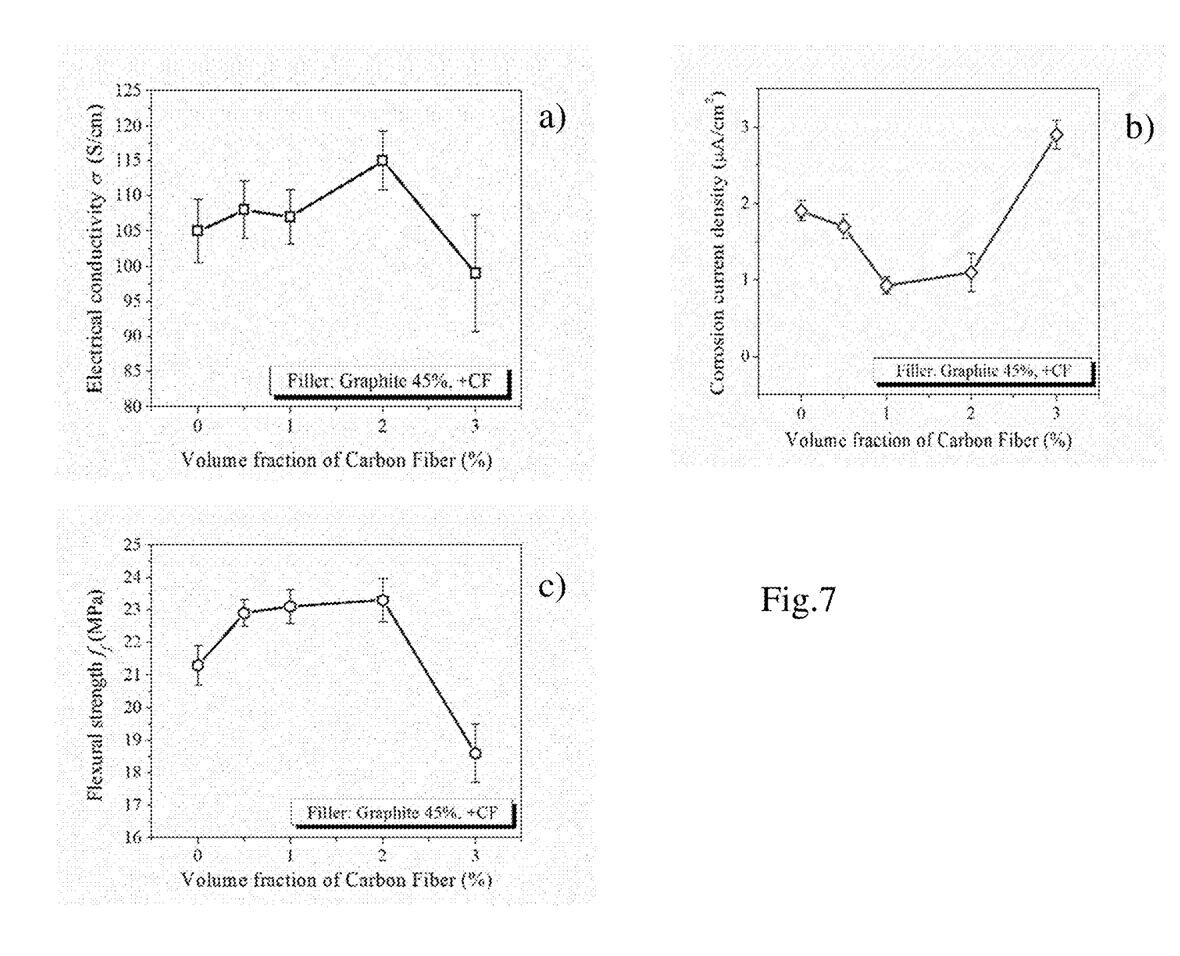
FIG. 7 shows the effect of carbon fiber on electrical conductivity, corrosion current density and flexural strength of the composite (data from G45, CF0.5, Ex. 2, CF2 and Ex. 3).
Figure 8:
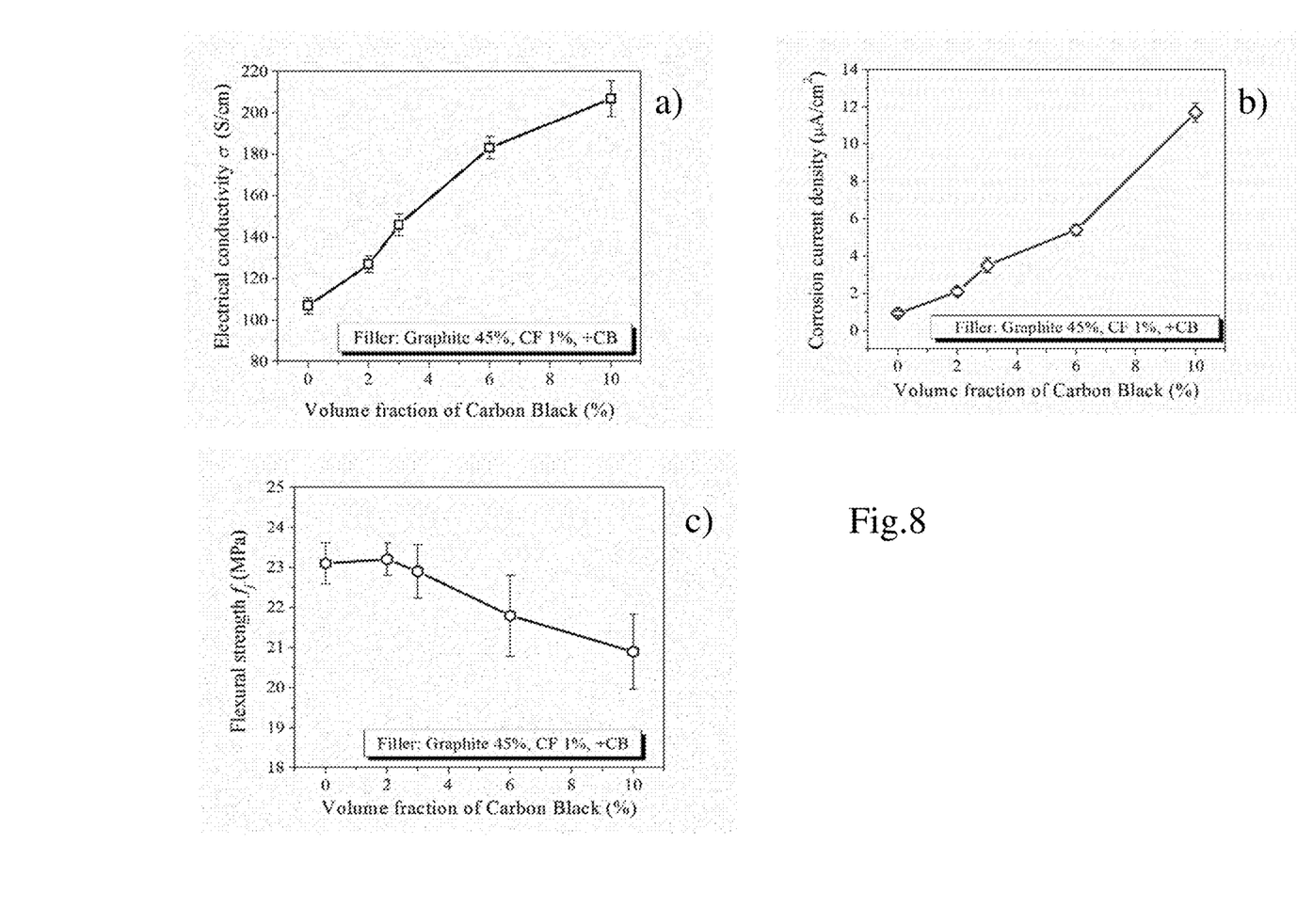
FIG. 8 shows the effect of carbon black on electrical conductivity, corrosion current density and flexural strength of the composite (data from Ex. 2, CB2, Ex. 4, CB6 and CB10).
Figure 9:
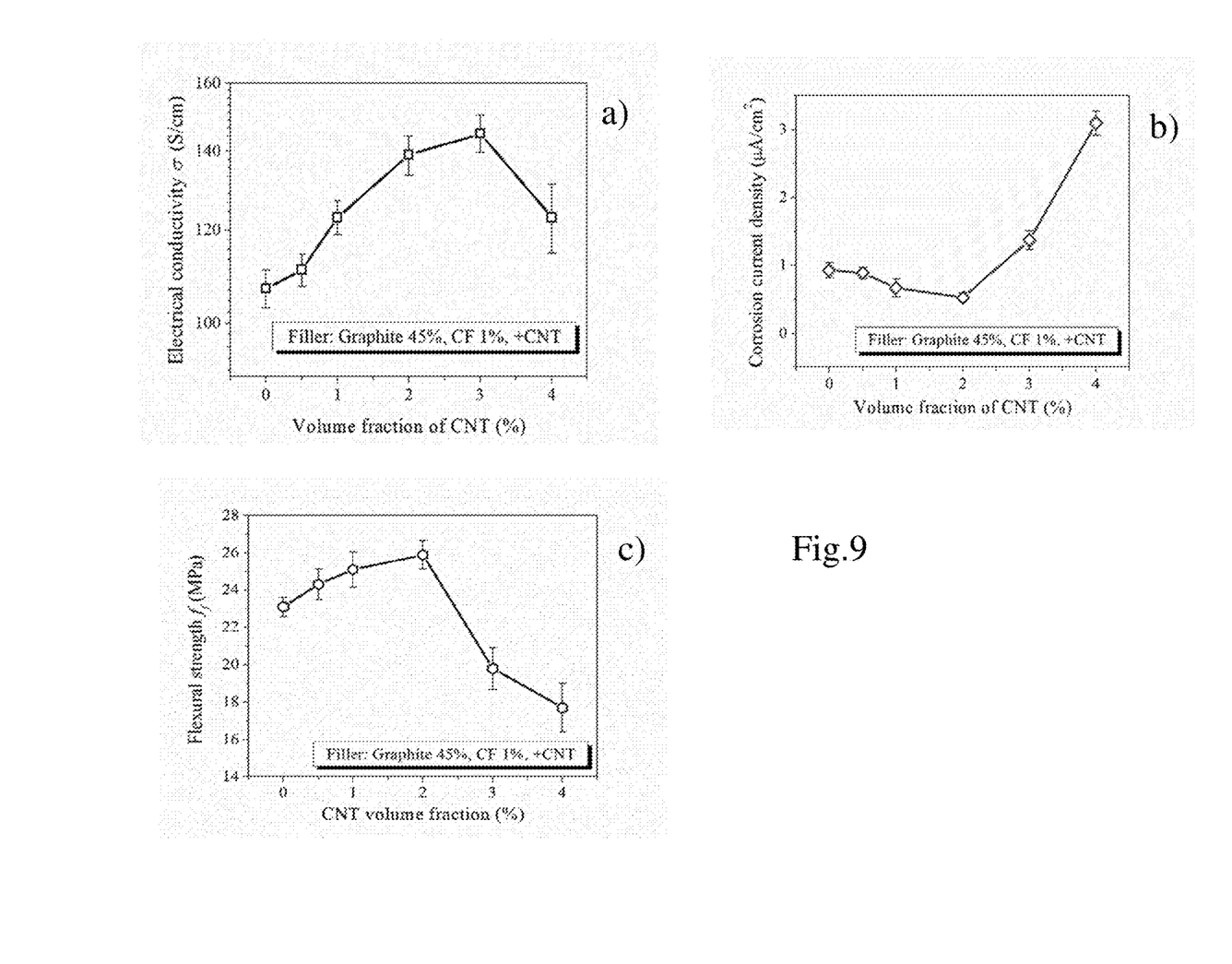
FIG. 9 shows the effect of CNT on electrical conductivity, corrosion current density and flexural strength of the composite (data from Ex. 2, CNT0.5, CNT1, Ex. 5, CNT3 and Ex. 6).

In Examples 1-8, the composite materials are processed into flat plates, for the ease of properties testing. However, the steel mold for hot-press can be tailor-designed according to the properties, for example shape and flow field, as demanded by the fuel cell. Two compression plate samples of the mold, with counter channels and lands, are shown in FIG. 5. With the use of the steel mold, bipolar plates composite material with flow field can be produced in the light of the aforementioned hot-press process.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, the automatic mechanical grinding setup for mixing the materials afore-described could be replaced by any setup or machines which can achieve the same results.

What is claimed is:

1. A method that produces a composite bipolar plate, the method comprising:
   mixing magnesium phosphate cement (MPC) raw materials, electrically conductive fillers, and water to produce a wet powder;
   placing a macro-reinforcement net in a steel mold;
   transferring the wet powder into the steel mold;
   hot-pressing the wet powder in the steel mold to produce a plate; and
   curing the plate by air to produce the composite bipolar plate,
   wherein a flexural strength of the composite bipolar plate is greater than 25 MPa.

2. The method of claim 1, wherein the macro-reinforcement net is an acrylonitrile butadiene styrene (ABS) co-polymer net.

3. The method of claim 1, wherein mixing of the MPC raw materials, the electrically conductive fillers, and the water are conducted in an automatic mechanical grinding setup.

4. The method of claim 1 further comprising:
   designing the steel mold according to a shape and flow field of a fuel cell device that is made of the composite bipolar plate.

5. The method of claim 1 wherein the hot-pressing is conducted under a compressive pressure of 70 MPa and a temperature of up to 140° C.

6. The method of claim 1, wherein the MPC raw materials include magnesia, potassium di-hydrogen phosphate, borax, fly ash, and water, and the electrically conductive fillers include graphite, carbon fibers, and carbon nanotubes.

7. A method that produces a composite bipolar plate, the method comprising:
   mixing magnesium phosphate cement (MPC) raw materials, electrically conductive fillers, and water to produce a wet powder;
   transferring the wet powder into a steel mold;
   hot-pressing the wet powder in the steel mold to produce a plate;
   converting the plate into an organic-inorganic interpenetrated product; and
   curing the organic-inorganic interpenetrated product by air to produce the composite bipolar plate,
   wherein a corrosion current density of the composite bipolar plate is 1×10$^{-6}$ A/cm$^2$.

8. The method of claim 7, further comprising:
   heating the plate to a mold temperature to produce a heated plate; and
   cooling the heated plate to produce the organic-inorganic interpenetrated product,
   wherein the mold temperature is higher than a melting point of an ultra-high molecular weight polyethylene.

9. The method of claim 7, wherein mixing of the MPC raw materials, the electrically conductive fillers, and the water are conducted in an automatic mechanical grinding setup.

10. The method of claim 7 further comprising:
    designing the steel mold according to a shape and flow field of a fuel cell device that is made of the composite bipolar plate.

11. The method of claim 7 wherein the hot-pressing is conducted under a compressive pressure of 70 MPa and a temperature of up to 140° C.

12. The method of claim 7 further comprising:
    placing a macro-reinforcement net in the steel mold,
    wherein a flexural strength of the composite bipolar plate is greater than 25 MPa.

13. The method of claim 7, wherein the MPC raw materials include magnesia, potassium di-hydrogen phosphate, borax, fly ash, water, and ultra-high molecular weight polyethylene, and the electrically conductive fillers include graphite, carbon fibers, and carbon nanotubes.

14. A method that produces a composite bipolar plate, the method comprising:
    mixing magnesium phosphate cement (MPC) raw materials, fillers, and water to produce a wet powder;
    placing a macro-reinforcement net in a steel mold;
    transferring the wet powder into the steel mold;
    replacing 30% of the powder in surface layers by ultra-high molecular weight polyethylene powder;
    hot-pressing the wet powder in the steel mold to produce a plate;

heating the plate to a mold temperature for at least 10 minutes to produce a heated plate;

cooling the heated plate to produce an organic-inorganic interpenetrated product; and curing the organic-inorganic interpenetrated product by air to produce the composite bipolar plate, wherein a flexural strength of the composite bipolar plate is greater than 25 MPa, and a corrosion current density of the bipolar plate composite material is $1\times10^{-6}$ A/cm$^2$.

15. The method of claim 14, wherein mixing of the MPC raw materials, the electrically conductive fillers, and the water are conducted in an automatic mechanical grinding setup.

16. The method of claim 14, wherein the macro-reinforcement net is an acrylonitrile butadiene styrene (ABS) co-polymer net.

17. The method of claim 14 further comprising:
designing the steel mold according to a shape and flow field of a fuel cell device that is made of the composite bipolar plate.

18. The method of claim 14 wherein the hot-pressing is conducted under a compressive pressure of 70 MPa and a temperature of up to 140° C.

19. The method of claim 14, wherein the mold temperature is higher than a melting point of an ultra-high molecular weight polyethylene.

20. The method of claim 14, wherein the MPC raw materials include magnesia, potassium di-hydrogen phosphate, borax, fly ash, water, and ultra-high molecular weight polyethylene, and the electrically conductive fillers include graphite, carbon fibers, and carbon nanotubes.

* * * * *